US010857768B2

(12) United States Patent
Oliveira et al.

(10) Patent No.: US 10,857,768 B2
(45) Date of Patent: Dec. 8, 2020

(54) MULTILAYER STRETCH FILMS AND METHODS THEREOF

(71) Applicants: Dow Global Technologies LLC, Midland, MI (US); PBBPolisur S.R.L., Buenos Aires (AR); Dow Quimica De Colombia S.A., Bogota (CO)

(72) Inventors: Marlos Giuntini De Oliveira, Sao Paulo (BR); Teresa P. Karjala, Lake Jackson, TX (US); Mustafa Bilgen, Manvel, TX (US); Jorge Caminero Gomes, Sao Paulo (BR); Maximiliano Zanetti, Buenos Aires (AR); Miguel A. Molano Niampira, Bogota (CO); Jorge Mario Rodriguez Camelo, Bogota (CO); Camila Do Valle, Paulo (BR); Guillermo A. Raimondi, Ciudad Autonoma BsAs (AR)

(73) Assignees: Dow Glo, Midland, MI (US); PBBPolisur S.R.L., Buenos Aires (AR); Dow Quimica de Colombia S.A., Bogota (CO)

( * ) Notice: Subject to any disclaimer, the term of this patent is extended or adjusted under 35 U.S.C. 154(b) by 0 days.

(21) Appl. No.: 16/331,757

(22) PCT Filed: Aug. 30, 2017

(86) PCT No.: PCT/US2017/049251
§ 371 (c)(1),
(2) Date: Mar. 8, 2019

(87) PCT Pub. No.: WO2018/063694
PCT Pub. Date: Apr. 5, 2018

(65) Prior Publication Data
US 2019/0210334 A1    Jul. 11, 2019

Related U.S. Application Data

(60) Provisional application No. 62/401,388, filed on Sep. 29, 2016.

(51) Int. Cl.
| | | |
|---|---|---|
| *B32B 7/02* | (2019.01) | |
| *B32B 27/08* | (2006.01) | |
| *B32B 27/32* | (2006.01) | |
| *B29C 48/18* | (2019.01) | |
| *C08F 210/16* | (2006.01) | |
| *B29L 9/00* | (2006.01) | |

(52) U.S. Cl.
CPC .............. *B32B 27/08* (2013.01); *B29C 48/18* (2019.02); *B32B 27/32* (2013.01); *B29L 2009/00* (2013.01); *B32B 2250/03* (2013.01); *B32B 2250/242* (2013.01); *B32B 2250/40* (2013.01); *B32B 2270/00* (2013.01); *B32B 2274/00* (2013.01); *B32B 2307/30* (2013.01); *B32B 2307/50* (2013.01); *B32B 2307/581* (2013.01); *B32B 2307/5825* (2013.01); *B32B 2307/72* (2013.01); *B32B 2307/744* (2013.01); *B32B 2439/46* (2013.01); *B32B 2553/00* (2013.01); *C08F 210/16* (2013.01); *C08F 2410/03* (2013.01)

(58) Field of Classification Search
CPC .. C08F 210/16; C08F 210/14; C08F 2500/03; C08F 2500/12; C08F 2500/17; C08F 2500/26; C08F 2/06; C08F 4/6555; C08F 4/658; C08F 4/685; C08F 2410/03; B29C 48/18; B29L 2009/00; B32B 2250/03; B32B 2250/242; B32B 2250/40; B32B 2270/00; B32B 2274/00; B32B 2307/30; B32B 2307/50; B32B 2307/581; B32B 2307/5825; B32B 2307/72; B32B 2307/744; B32B 2439/46; B32B 2553/00; B32B 27/08; B32B 27/32
See application file for complete search history.

(56) References Cited

U.S. PATENT DOCUMENTS

| | | | |
|---|---|---|---|
| 5,360,648 A | * | 11/1994 | Falla ....................... B32B 27/32 428/35.2 |
| 9,296,182 B2 | | 3/2016 | Vinck et al. |
| 2013/0085231 A1 | | 4/2013 | Lue et al. |
| 2015/0376354 A1 | | 12/2015 | Chen et al. |

FOREIGN PATENT DOCUMENTS

| | | |
|---|---|---|
| EP | 1839851 A2 | 10/2007 |
| JP | 2000188966 A | 7/2000 |
| JP | 2000246852 A | 9/2000 |
| JP | 2002355937 A | 12/2002 |
| JP | 3841453 B2 | 11/2006 |
| JP | 4232561 B2 | 3/2009 |
| WO | 2015200742 A1 | 12/2015 |
| WO | 2017004786 A1 | 1/2017 |

OTHER PUBLICATIONS

PCT/US2017/049251, International Search Report and Written Opinion dated Dec. 6, 2017.
PCT/US2017/049251, International Preliminary Report on Patentability dated Apr. 11, 2019.

* cited by examiner

*Primary Examiner* — Lawrence D Ferguson

(57) ABSTRACT

Embodiments disclosed herein include multilayer cast films having a first outer layer, a core layer, and a second outer layer, wherein the first outer layer comprises (a) a linear low density polyethylene (LLDPE), ultra-low density polyethylene (ULDPE), a first polyethylene composition, or combinations of two or more thereof, and (b) polyisobutylene, and the core layer comprises a core layer polyethylene composition.

13 Claims, No Drawings

MULTILAYER STRETCH FILMS AND METHODS THEREOF

TECHNICAL FIELD

Embodiments of the present disclosure generally relate to multilayer stretch films, and more particularly, to multilayer stretch films having a high cling force.

BACKGROUND

Multilayer films are often used in packaging, and may package diverse items, such as, bulk farm materials like grass and hay to small grocery store items like meats and vegetables. For all of these items it is usually desirable to have a strong, stretchy film that has a sufficient level of tack or cling such that the film can adhere to itself and/or an article that is wrapped with the film.

Cling is one of the key performance requirements in stretch films. To achieve the desired level of cling, additives may be incorporated into a first outer layer to improve the tack of the first outer layer. However, films that include such additives can have a higher cost compared to the base resins and may have a significant impact on the overall cost of the stretch film.

Accordingly, alternative multilayer films may be desired having improved properties, such as, high cling, while also being cost-effective and/or relatively easy to fabricate using cast film techniques.

SUMMARY

Disclosed in embodiments herein are multilayer cast films. The multilayer cast films comprise a first outer layer, a core layer, and a second outer layer, wherein: the first outer layer comprises (a) a linear low density polyethylene (LLDPE), ultra-low density polyethylene (ULDPE), a first polyethylene composition, or combinations of two or more thereof, and (b) polyisobutylene; and the core layer comprises a core layer polyethylene composition which comprises the reaction product of ethylene and, optionally, one or more alpha olefin comonomers, wherein the core layer polyethylene composition is characterized by the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.2 to 3.6.

Also disclosed in embodiments herein are methods of making multilayer cast films. The methods comprise coextruding a coextruding a first outer layer composition, a core layer composition, and a second outer layer composition to form a multilayer cast film; wherein the first outer layer composition comprises (a) a linear low density polyethylene (LLDPE), ultra-low density polyethylene (ULDPE), a first polyethylene composition, or combinations of two or more thereof, and (b) polyisobutylene; wherein the core layer composition comprises a core layer polyethylene composition which comprises the reaction product of ethylene and, optionally, one or more alpha olefin comonomers, wherein the polyethylene composition is characterized by the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.2 to 3.6; and wherein the second outer layer composition comprises a linear low density polyethylene or a second polyethylene composition which comprises the reaction product of ethylene and, optionally, one or more alpha olefin comonomers, wherein the polyethylene composition is characterized by the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.2 to 3.6.

Additional features and advantages of the embodiments will be set forth in the detailed description which follows, and in part will be readily apparent to those skilled in the art from that description or recognized by practicing the embodiments described herein, including the detailed description which follows the claims. It is to be understood that both the foregoing and the following description describe various embodiments and are intended to provide an overview or framework for understanding the nature and character of the claimed subject matter. The description serves to explain the principles and operations of the claimed subject matter.

DETAILED DESCRIPTION

Reference will now be made in detail to embodiments of multilayer cast films and materials used to make such films. "Multilayer cast film" and "multilayer film" may be used herein interchangeably to reference the multilayer cast films described herein. The multilayer cast films may be used in stretch-cling applications. It is noted, however, that this is merely an illustrative implementation of the embodiments disclosed herein. The embodiments are applicable to other technologies that are susceptible to similar problems as those discussed above. For example, the multilayer cast films described herein may be used as surface protection films, agricultural films, such as silage wrap, or in other flexible packaging applications, such as, shrink films, heavy duty shipping sacks, liners, sacks, stand-up pouches, detergent pouches, sachets, etc., all of which are within the purview of the present embodiments.

In embodiments described herein, the multilayer cast films comprise a first outer layer, a core layer, and a second outer layer. Optionally, one or more intermediate layers may be positioned between the first outer layer and the core layer and/or the core layer and the second outer layer. The first outer layer is an outer layer of the multilayer cast film that has a sufficient level of adhesive tack such that the first outer layer of the multilayer cast film may form a bond, and in some circumstances, a releasable bond, when brought into contact with a surface, such as, the surface of an article or the surface of the second outer layer. The second outer layer is an outer layer of the multilayer cast film that, in some circumstances, exhibits a low adhesion to the first outer layer, or in other circumstances, has a sufficient level of adhesive tack to form a bond with the first outer layer.

The thickness of the first outer layer, core layer, and second outer layer can vary over a wide range. In some embodiments, the first outer layer may have a thickness that is from 5-50 percent of the overall thickness of the film, from 5-30 percent of the overall thickness of the film, or even from 5-20 percent of the overall thickness of the film. The core layer may have a thickness that is from 20-90 percent of the overall thickness of the film, 30-90 percent of the overall thickness of the film, 50-90 percent of the overall thickness of the film, or 60-90 percent of the overall thickness of the film. The second outer layer may have a thickness that is from 5-50 percent of the overall thickness of the film, from 5-30 percent of the overall thickness of the film, or even from 5-20 percent of the overall thickness of the film. The ratio of the thicknesses among a first outer layer, a second outer layer, and the core layer can be any ratio that provides desirable properties such as cling, release, and the like. In some embodiments, a multilayer cast film can have a first outer layer thickness, a core layer thickness, and a second outer layer thickness in a ratio in the range of 1:8:1 to 3:4:3.

First Outer Layer

The first outer layer comprises (a) a linear low density polyethylene (LLDPE), ultra-low density polyethylene (ULDPE), a first polyethylene composition, or combinations of two or more thereof, and (b) polyisobutylene. In embodiments herein, the first outer layer comprises from 0.5 wt. % to 10 wt. %, based on the total weight of polymers present in the first outer layer, of the polyisobutylene. All individual values and subranges of from 0.5 wt. % to 10 wt. % are included and disclosed herein. For example, in some embodiments, the first outer layer comprises from 0.5 wt. % to 9 wt. %, 1 wt. % to 9 wt. %, 2 wt. % to 9 wt. %, or 3 wt. % to 8 wt. %, based on the total weight of polymers present in the first outer layer, of the polyisobutylene. The first outer layer may comprise from 50 wt. % to 99.5 wt. % of the linear low density polyethylene (LLDPE), ultra-low density polyethylene (ULDPE), a first polyethylene composition, or combinations of two or more thereof.

Optionally, the first outer layer can include one or more additives, such as pigments, inorganic fillers, UV stabilizers, antioxidants, etc., and/or one or more additional polymers. The resins in the first outer layer can be dry blended or melt-blended with Methods of dry blending resins can be found in U.S. Pat. No. 3,318,538 (Needham), the entirety of which patent is incorporated herein by reference. Methods of melt blending resins can be found in U.S. Pat. No. 6,111,019 (Arjunan et al.), the entirety of which patent is incorporated herein by reference.

Linear Low Density Polyethylene (LLDPE)

The linear low density polyethylene may be a homogeneously branched or heterogeneously branched and/or unimodal or multimodal (e.g., bimodal) polyethylene. As used herein, "unimodal" refers to the molecular weight distribution (MWD) in a gel permeation chromatography (GPC) curve does not substantially exhibit multiple component polymers (i.e., no humps, shoulders or tails exist or are substantially discernible in the GPC curve). In other words, the degree of separation is zero or substantially close to zero. As used herein, "multimodal" refers to the MWD in a GPC curve exhibits two or more component polymers, wherein one component polymer may even exist as a hump, shoulder or tail relative to the MWD of the other component polymer. The linear low density polyethylene comprises ethylene homopolymers, interpolymers of ethylene and at least one comonomer, and blends thereof. Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-hexene, and 1-octene. In other embodiments, the linear low density polyethylene is an ethylene/alpha-olefin copolymer, wherein the alpha-olefin is selected from the group consisting of 1-hexene and 1-octene.

In some embodiments, the linear low density polyethylene is an ethylene/alpha-olefin copolymer that may comprise greater than 70%, by weight, of the units derived from ethylene, for example, at least 80%, at least 90%, at least 92%, at least 95%, at least 98%, at least 99%, from greater than 70% to 99.5%, from 80% to 99.5%, from 90% to 99.5%, from 92% to 99.5%, or from 95% to 99.5%, by weight, of the units derived from ethylene, and less than 30%, by weight, of units derived from one or more alpha-olefin comonomers, for example, less than 20%, less than 10%, less than 8%, less than 5%, less than 2%, less than 1%, from 0.5 to 30%, 0.5 to 20%, 0.5 to 10%, 0.5 to 8%, or 0.5 to 5%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Other examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or U.S. Pat. No. 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5230G or 5220B resins, ELITE™ AT 6111, ATTANE™ 44404G or 4607G resins, AFFINITY™ PL1845G, and DOWLEX™ 2247G, 2047G, or 2107B resins; EXCEED™ or ENABLE™ resins sold by Exxon Mobil Corporation, including, for example, EXCEED™ 3518CB, or 4518CB resins, and ENABLE™ 20-10 resin; linear low density polyethylene resins sold by Westlake Chemical Corporation, including, for example, HIFOR LF1040AA or HIFOR Xtreme™ SC74871 resins; linear low density polyethylene resins sold by LyondellBasell Industries, including, for example, PETROTHENE™ GA502024 and GA502129 resins; linear low density polyethylene resins sold by Nova Chemicals Corp., including, for example, SCLAIR™ FG220-A and NOVAPOL™ TF-0219-E; linear low density polyethylene resins sold by Chevron Phillips Chemical Company, LLC, including, for example, MARLEX D173 resin or D174 resins; linear low density polyethylene resins sold by Braskem Petroquímica, including, for example, LL4801N or LF0320 resins and FLEXUS 7200XP resin.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. In some embodiments, the LLDPE may be a znLLDPE, which refers to linear polyethylene made using Ziegler-Natta catalysts, a uLLDPE or "ultra linear low density polyethylene," which may include linear polyethylenes made using Ziegler-Natta catalysts, or a mLLDPE, which refers to LLDPE made using metallocene or constrained geometry catalyzed polyethylene. In some embodiments, unimodal LLDPE may be prepared using a single stage polymerization, e.g. slurry, solution, or gas phase polymerization. In some embodiments, the unimodal LLDPE may be prepared via solution polymerization. In other embodiments, the unimodal LLDPE may be prepared via slurry polymerization in a slurry tank. In another embodiment, the unimodal LLDPE may be prepared in a loop reactor, for example, in a single stage loop polymerization process. Loop reactor processes are further described in WO/2006/045501 or WO2008104371. Multimodal (e.g. bimodal) polymers can be made by mechanical blending of two or more separately prepared polymer components or prepared in-situ in a multistage polymerization process. Both mechanical blending and preparation in-situ. In some embodiments, a multimodal LLDPE may be prepared in-situ in a multistage, i.e. two or more stage, polymerization or by the use of one or more different polymerization catalysts, including single-, multi- or dual site catalysts, in a one stage polymerization. For example, the multimodal LLDPE is produced in at least two-stage polymerization using the same catalyst, for e.g. a single site or Ziegler-Natta catalyst, as disclosed in U.S. Pat. No. 8,372,931, which is herein incorporated by reference. Thus, for example two solution reactors, two slurry reactors, two gas phase reactors, or any combinations thereof, in any order can be employed, such as disclosed in U.S. Pat. No. 4,352,915 (two slurry reactors), U.S. Pat. No. 5,925,448 (two fluidized bed reactors), and U.S. Pat. No. 6,445,642 (loop reactor followed by a gas phase reactor). However, in other embodiments, the multimodal polymer, e.g. LLDPE, may be made using a slurry polymerization in a loop reactor followed by a gas phase polymerization in a gas phase reactor, as disclosed in EP 2653392 A1, which is herein incorporated by reference.

In embodiments herein, the linear low density polyethylene has a density of 0.900 to 0.965 g/cc. All individual values and subranges from 0.900 to 0.965 g/cc are included and disclosed herein. For example, in some embodiments, the linear low density polyethylene has a density of 0.910 to 0.935 g/cc, 0.910 to 0.930 g/cc, 0.910 to 0.927 g/cc, 0.910 to 0.925 g/cc, or 0.910 to 0.920 g/cc. In other embodiments, the linear low density polyethylene has a density of 0.930 to 0.965 g/cc, or 0.932 to 0.950 g/cc, 0.932 to 0.940 g/cc or 0.932 to 0.938 g/cc. Densities disclosed herein are determined according to ASTM D-792.

In embodiments herein, the linear low density polyethylene has a melt index, or I2, of 2.5 g/10 min to 15.0 g/10 min. All individual values and subranges from 2.5 g/10 min to 15.0 g/10 min are included and disclosed herein. For example, in some embodiments, the linear low density polyethylene has a melt index of 2.5 g/10 min to 12.0 g/10 min, 2.5 g/10 min to 10.0 g/10 min, 2.5 g/10 min to 8.0 g/10 min, or 2.5 g/10 min to 5.0 g/10 min. Melt index, or I2, is determined according to ASTM D1238 at 190° C., 2.16 kg.

In some embodiments, the linear low density polyethylene may have a melt index ratio, I10/I2, of from 6 to 20. All individual values and subranges are included and disclosed herein. For example, the linear low density polyethylene may have a melt index ratio, I10/I2, of from 7 to 20, from 9 to 20, from 10 to 20, from 12 to 20, or from 15 to 20. In other embodiments, the linear low density polyethylene may have a melt index ratio, I10/I2, of from 6 to 18, from 6 to 16, from 6 to 15, from 6 to 12, from 6 to 10, or from 6 to 8.

In some embodiments, the linear low density polyethylene may have an Mw/Mn ratio of less than 10.0. All individual values and subranges are included and disclosed herein. For example, the linear low density polyethylene may have an Mw/Mn ratio of less than 9.0, less than 7.0, less than 6.0, less than 5.5, less than 5.0, less than 4.5, less than 4.0, or less than 3.8. In other embodiments, the linear low density polyethylene may have an Mw/Mn ratio of from 2.0 to 10.0, from 2.0 to 8.0, from 2.0 to 6.0, 2.0 to 5.5, 2.0 to 5.0, 2.0 to 4.5, 2.0 to 4.0, 2.2 to 6.0, 2.2 to 5.5, 2.2 to 5.0, 2.2 to 4.5, 2.2 to 4.0, 2.5 to 6.0, 2.5 to 5.5, 2.5 to 5.0, 2.5 to 4.5, or 2.5 to 4.0. The Mw/Mn ratio may be determined by gel permeation chromatography (GPC) as outlined below.

In some embodiments, the linear low density polyethylene may have an Mz/Mw ratio of 1.5 to 6.0. All individual values and subranges are included and disclosed herein. The linear low density polyethylene can range from a lower limit of 1.5, 1.75, 2.0, 2.5, 2.75, 3.0, or 3.5 to an upper limit of 1.65, 1.85, 2.0, 2.55, 2.90, 3.34, 3.79, 4.0, 4.3, 4.5, 5.0, 5.25, 5.5, 5.8, 6.0. For example, in some embodiments, the linear low density polyethylene may have an Mz/Mw ratio of 1.5 to 5.5, 1.5 to 5.0, 1.5 to 4.0, 1.5 to 3.5, 1.5 to 3.0, or from 1.5 to 2.5.

Ultra-Low Density Polyethylene (ULDPE)

The ultra-low density polyethylene comprises heterogeneously branched interpolymers of ethylene and at least one comonomer. Examples of suitable comonomers include alpha-olefins containing from 3 to 20 carbon atoms (C3-C20). For example, the alpha-olefin may be a C4-C20 alpha-olefin, a C4-C12 alpha-olefin, a C4-C10 alpha-olefin, or a C4-C8 alpha-olefin. In some embodiments, the ultra-low density polyethylene is an ethylene/alpha-olefin copolymer, wherein the alpha-olefin is selected from the group consisting of propylene, 1-butene, 1-hexene, and 1-octene. As used herein, ULDPE also includes and is used interchangeably with very low density polyethylene (VLDPE), which is often used to refer to ethylene-butene copolymers.

In some embodiments, the ultra-low density polyethylene is an ethylene/alpha-olefin copolymer that may comprise greater than 70 mol. % of the units derived from ethylene, for example, at least 80 mol. %, at least 85 mol. %, at least 90 mol. %, at least 92 mol. %, at least 95 mol. %, at least 98 mol. %, at least 99 mol. %, from greater than 70 mol. % to 99.5 mol. %, from 80 mol. % to 99.5 mol. %, from 85 mol. % to 99.5 mol. %, from 90 mol. % to 99.5 mol. %, from 92 mol. % to 99.5 mol. %, or from 95 mol. % to 99.5 mol. % of the units derived from ethylene, and less than 30 mol. % of units derived from one or more alpha-olefin comonomers, for example, less than 20 mol. %, less than 10 mol. %, less than 8 mol. %, less than 5 mol. %, less than 2 mol. %, less than 1 mol. %, from 0.5 to 30 mol. %, 0.5 to 20 mol. %, 0.5 to 10 mol. %, 0.5 to 8 mol. %, or 0.5 to 5 mol. % of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Other examples of suitable ultra-low density polyethylene include polymers that are further defined in WO/2015/120401, which is incorporated herein by reference. In some embodiments, the ultra-low density polyethylene may include the ATTANE™ resins, such as ATTANE™ 4203, 4210G, 4404G, or 4607G; the ENGAGE™ resins, such as, ENGAGE™ HM-7289 or HM-7280; DFDA-1086; and DFDB-9042, all of which are available from The Dow Chemical Company; the MXSTEN™ resins, such as, CV77519, CV77523, CV77526, CV77516, or CV77518, available from Westlake Chemical Company; LUMITAC™ ultra low density polyethylene resins, available from Tosoh Corporation.

The ultra-low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas phase or solution reactors are used. The catalysts used to make the ultra-low density polyethylene described herein may include Ziegler-Natta, chrome, metallocene, constrained geometry, or single site catalysts. In some embodiments, the ULDPE may be made using Ziegler-Natta catalyst techniques as described in U.S. Publication Numbers 2008/0038571 (Klitzmiller et al.) and 2008/0176981 (Biscoglio et al.), the entirety of which publications are incorporated herein by reference. In some embodiments, Ziegler-Natta catalyzed ULDPE includes a copolymer of ethylene and 3.5 to 10.5 mole percent of at least one $C_3$-$C_{20}$ α-olefins comonomer.

In embodiments described herein, the ULDPE may have a density of 0.885 to 0.915 g/cc. All individual values and subranges of from 0.885 to 0.915 g/cc are included and disclosed herein. For example, in some embodiments, the ULDPE has a density of 0.885 to 0.910 g/cc, 0.890 to 0.915 g/cc, 0.890 to 0.912 g/cc, 0.895 to 0.905 g/cc, or 0.899 to 0.905 g/cc. Density may be measured according to ASTM D792.

In addition to the density, the ULDPE may have a melt index (I2) in the range of 0.1 to 30 grams/10 minutes. All individual values and subranges of from 0.1 to 30 grams/10 minutes are included and disclosed herein. For example, in some embodiments, the ULDPE has a melt index ($I_2$) in the range of 0.1 to 25 g/10 minutes, 0.1 to 20 g/10 minutes, 0.1 to 15 g/10 minutes, 0.1 to 10 g/10 minutes, or 0.5 to 10 grams/10 minutes. Melt index ($I_2$) may be measured according to ASTM D1238, condition 190° C./2.16 kg.

In addition to the density and melt index (I2), the ULDPE may have a molecular weight distribution ($M_w/M_n$) of from 3.0 to 6.0. Molecular weight distribution can be described as the ratio of weight average molecular weight ($M_w$) to number average molecular weight ($M_n$) (i.e., $M_w/M_n$), and can be measured by gel permeation chromatography techniques as outlined below.

First Polyethylene Composition

The first polyethylene composition is characterized by the following properties: (a) a melt index, I2, of from 2.5 to 12.0 g/10 min or 2.5 to 8.0 g/10 min; (b) a density of from 0.910 to 0.925 g/cc or 0.912 to 0.920 g/cc; (c) a melt flow ratio, I10/I2, of from 6.0 to 7.6, 6.0 to 7.4, or 6.4 to 7.4; and (d) a molecular weight distribution, (Mw/Mn) of from 2.2 to 3.6 or 2.5 to 3.5. In further embodiments, the first polyethylene composition may have a CDBI of less than 60%, 55%, or 52.5% to 60%. The first polyethylene composition is formed in the presence of a catalyst composition comprising a multi-metallic procatalyst via solution polymerization as further described herein.

Core Layer

The core layer comprises a core layer polyethylene composition that comprises the reaction product of ethylene and, optionally, one or more alpha olefin comonomers, wherein the core layer polyethylene composition is characterized by the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.2 to 3.6.

The core layer polyethylene composition comprises greater than 50 wt. % of the units derived from ethylene and less than 30 wt. % of the units derived from one or more alpha-olefin comonomers. In some embodiments, the core layer polyethylene composition comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) optionally, less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more a-olefin comonomers. The comonomer content may be measured using any suitable technique, such as techniques based onnuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. Those skilled in the art will understand that the selected monomers are desirably those that do not destroy conventional Ziegler-Natta catalysts. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the core layer polyethylene composition comprises greater than 0 wt. % and less than 30 wt. % of units derived from one or more of octene, hexene, or butene comonomers.

In some embodiments, the core layer polyethylene composition of the core layer is formed in the presence of a catalyst composition comprising a multi-metallic procatalyst via solution polymerization. The multi-metallic procatalyst used in producing the reaction product is at least trimetallic, but may also include more than three transition metals, and thus may in one embodiment be defined more comprehensively as multi-metallic. These three, or more, transition metals are selected prior to production of the catalyst. In a particular embodiment, the multi-metal catalyst comprises titanium as one element.

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.25 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., alternatively, 0° C. to 50° C.; a time ranging from 1 to 12 hours, alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. The conditioning compound has a molar ratio constitution that is specific and which is believed to be an important feature in ensuring the desirable catalyst performance. Specifically, the procatalyst desirably exhibits a molar ratio of the magnesium to the conditioning compound that ranges from 3:1 to 6:1. Without wishing to be bound by any theory of mechanism, it is suggested that this aging serves to facilitate or enhance adsorption of additional metals onto the support.

Once the conditioned support is prepared and suitably aged, it is brought into contact with a titanium compound which may be added individually or as a mixture with the "second metal". In certain preferred embodiments titanium halides or alkoxides, or combinations thereof, may be selected. Conditions may include a temperature within the range from 0° C. to 50° C., alternatively from 25° C. to 35° C.; a time from 3 hours to 24 hours, alternatively from 6 hours to 12 hours; or both. The result of this step is adsorption of at least a portion of the titanium compound onto the conditioned magnesium halide support.

Finally, one or two additional metals, referred to herein as "the second metal" and "the third metal" for convenience, will also be adsorbed onto the magnesium-based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

In embodiments described herein, the core layer polyethylene composition may have a metal catalyst residual of greater than or equal to 1 parts by combined weight of at least three metal residues per one million parts of polyethylene polymer, wherein the at least three metal residues are selected from the group consisting of titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the core layer polyethylene composition may further comprise greater than or equal to 2 parts by combined weight of at least three metal residues remaining from the multi-metallic polymerization catalyst per one million parts of the core layer polyethylene composition.

In some embodiments, the core layer polyethylene composition comprises at least 0.75 ppm of V (Vanadium). All individual values and subranges from at least 0.75 ppm of V are included and disclosed herein; for example the lower limit of the V in the core layer polyethylene composition may be 0.75, 1, 1.1, 1.2, 1.3 or 1.4 ppm to an upper limit of the V in the core layer polyethylene composition may be 5, 4, 3, 2, 1.9, 1.8, 1.7, 1.6, 1.5, or 1 ppm. The vanadium catalyst metal residual concentration for the core layer polyethylene composition can be measured using the Neutron Activation Method for Metals described below.

In some embodiments, the core layer polyethylene composition comprises at least 0.3 ppm of Zr (Zirconium). All individual values and subranges of at least 0.3 ppm of Zr are included and disclosed herein; for example the lower limit of the Zr in the core layer polyethylene composition may be 0.3, 0.4, 0.5, 0.6 or 0.7 ppm. In yet another embodiment, the upper limit of the Zr in the core layer polyethylene composition may be 5, 4, 3, 2, 1, 0.9, 0.8 or 0.7 ppm. The zirconium catalyst metal residual concentration for the core layer polyethylene composition can be measured using the Neutron Activation Method for Metals described below.

In embodiments described herein, the core layer polyethylene composition may have a density of 0.910 g/cc to 0.925 g/cc. All individual values and subranges of at least 0.910 g/cc to 0.925 g/cc are included and disclosed herein. For example, in some embodiments, the polyethylene has a density of 0.910 to 0.923 g/cc, 0.912 to 0.923 g/cc, or 0.912 to 0.920 g/cc. Density may be measured in accordance with ASTM D792.

In addition to the density, the core layer polyethylene composition may have a melt index, I2, of 2.5 g/10 min to 12.0 g/10 min. All individual values and subranges of at least 2.5 g/10 min to 12.0 g/10 min are included and disclosed herein. For example, in some embodiments, the core layer polyethylene composition may have a melt index, I2, of 2.5 g/10 min to 10.0 g/10 min, 2.5 g/10 min to 8.0 g/10 min, or 2.5 g/10 min to 5.0 g/10 min. Melt index, I2, may be measured in accordance with ASTM D1238 (190° C. and 2.16 kg).

In addition to the density and melt index, I2, the core layer polyethylene composition may have a melt flow ratio, I10/I2, of from 6.0 to 7.6. All individual values and subranges of from 6.0 to 7.6 are included and disclosed herein. For example, in some embodiments, the core layer polyethylene composition may have a melt flow ratio, I10/I2, ranging from a lower limit of 6.0, 6.2, 6.3, or 6.5 to an upper limit of 7.6, 7.5, 7.3, 7.1, or 7.0. In other embodiments, the core layer polyethylene composition may have a melt flow ratio, I10/I2, of from 6.0 to 7.4, 6.4 to 7.4, or 6.5 to 7.3. Melt index, I10, may be measured in accordance with ASTM D1238 (190° C. and 10.0 kg).

In addition to the density, melt index, I2, and melt flow ratio, I10/I2, the core layer polyethylene composition may have a molecular weight distribution (Mw/Mn) of from 2.2 to 3.6. All individual values and subranges of from 2.2 to 3.6 are included and disclosed herein. For example, the core layer polyethylene composition may have an Mw/Mn ratio from a lower limit of 2.25 or 2.5 to an upper limit of 3.6, 3.5, 3.2, or 3.0. In some embodiments, the core layer polyethylene composition may have an Mw/Mn ratio of from 2.5 to 3.5 or 2.5 to 3.2. Molecular weight distribution can be described as the ratio of weight average molecular weight ($M_w$) to number average molecular weight ($M_n$) (i.e., $M_w/M_n$), and can be measured by gel permeation chromatography techniques as outlined below.

In addition to the density, melt index, I2, melt flow ratio, I10/I2, and molecular weight distribution (Mw/Mn), the core layer polyethylene composition may have a number average molecular weight, Mn (g/mol), of from 30,000 to 50,000 g/mol. All individual values and subranges of from 30,000 to 50,000 g/mol are included and disclosed herein. For example, the core layer polyethylene composition may have a Mn from 30,000 to 45,000 g/mol, 30,000 to 40,000 g/mol, 32,000 to 38,000 g/mol, 32,000 to 37,000 g/mol, or 32,000 to 36,000 g/mol.

In addition to the density, melt index, I2, melt flow ratio, I10/I2, molecular weight distribution (Mw/Mn), and number average molecular weight, the core layer polyethylene composition may have a weight average molecular weight, Mw (g/mol), of from 60,000 to 110,000 g/mol. All individual values and subranges of from 60,000 to 110,000 g/mol are included and disclosed herein. For example, the core layer polyethylene composition may have an Mw from 65,000 to 105,000 g/mol, 70,000 to 100,000 g/mol, or 80,000 to 100,000 g/mol.

In addition to the density, melt index, I2, melt flow ratio, I10/I2, molecular weight distribution (Mw/Mn), number average molecular weight, and weight average molecular weight, the core layer polyethylene composition may have a z average molecular weight, Mz (g/mol), of from 200,000 to 325,000 g/mol. All individual values and subranges of from 200,000 to 325,000 g/mol are included and disclosed herein. For example, the core layer polyethylene composition may have an Mz from 205,000 to 315,000 g/mol, 210,000 to 300,000 g/mol, or 225,000 to 275,000 g/mol.

In addition to the density, melt index, I2, melt flow ratio, I10/I2, molecular weight distribution (Mw/Mn), number average molecular weight, weight average molecular weight, and z average molecular weight, the core layer polyethylene composition may have a viscosity ratio (viscosity at 0.1 rad/s/viscosity at 100 rad/s, both measured at 190° C. using dynamic mechanical spectroscopy) of 2 to 6. All individual values and subranges of from 2 to 6 are included and disclosed herein. For example, the core layer polyethylene composition may have a viscosity ratio of from 2 to 4, 2 to 3.5, or 2.0 to 2.9.

In addition to the density, melt index, I2, melt flow ratio, I10/I2, molecular weight distribution (Mw/Mn), number average molecular weight, weight average molecular weight, z average molecular weight, and viscosity ratio, the core layer polyethylene composition may have a tan delta at 0.1 rad/s measured at 190° C. of 15 to 40. All individual values and subranges of from 15 to 40 are included and disclosed herein. For example, the core layer polyethylene composition may have a tan delta at 0.1 rad/s measured at 190° C. of from 20 to 40, 25 to 40, or 25 to 35.

In addition to the density, melt index, I2, melt flow ratio, I10/I2, molecular weight distribution (Mw/Mn), number average molecular weight, weight average molecular weight, z average molecular weight, viscosity ratio, and tan delta, the core layer polyethylene composition may have a composition distribution breadth index, CDBI, of less than 60%. All individual values and subranges of less than 60% are included and disclosed herein. For example, in some embodiments, the core layer polyethylene composition may have a CDBI of less than 58% or 55%. In other embodiments, the CDBI may be from 30% to 60%, 40% to 60%, or 52.5% to 60%.

The CDBI may be defined as the weight percent of the polymer molecules having a comonomer content within 50 percent of the median total molar comonomer content. The CDBI of linear polyethylene, which does not contain a comonomer, is defined to be 100%. The CDBI of a copolymer is readily calculated from data obtained from crystallization elution fractionation ("CEF") as described below. Unless otherwise indicated, terms such as "comonomer content", "average comonomer content" and the like refer to the bulk comonomer content of the indicated interpolymer blend, blend component, or fraction on a molar basis.

In embodiments herein, the core layer comprises from 60 wt. % to 100 wt. % of the core layer polyethylene composition. All individual values and subranges of from 60 wt. % to 100 wt. % are included and disclosed herein. For example, in some embodiments, the core layer comprises from 70 wt. % to 100 wt. %, 80 wt. % to 100 wt. %, 90 wt. % to 100 wt. %, or 95 wt. % to 100 wt. % by weight of polymers present in the core layer, of the core layer polyethylene composition.

In embodiments described herein, the core layer may further comprise a linear low density polyethylene (LLDPE), low density polyethylene (LDPE), or blends thereof. In some embodiments, the core layer may further comprise an LLDPE, LDPE, or blends thereof in an amount ranging from 1 wt. % to 40 wt. %, 1 wt. % to 30 wt. %, 1 wt. % to 25 wt. %, 5 wt. % to 25 wt. %, or 5 wt. % to 20 wt. %, by weight of the core layer. The LLDPE may have a density in the range of 0.912 to 0.940 grams/cm$^3$ and a melt index in the range of 0.5 to 30 grams/10 minutes. The LDPE may have a density in the range of 0.910 to 0.935 g/cm$^3$ and a melt index in the range of 0.2 to 20 g/10 min. The core layer may further comprise one or more additives, such as pigments, inorganic fillers, UV stabilizers, antioxidants, etc.

Second Outer Layer

The second outer layer comprises one or more of LDPE, LLDPE, or a second polyethylene composition characterized by the following properties: (a) a melt index, I2, of from 2.5 to 12.0 g/10 min or 2.5 to 8.0; (b) a density of from 0.910 to 0.925 g/cc or 0.912 to 0.920 g/cc; (c) a melt flow ratio, I10/I2, of from 6.0 to 7.6, 6.0 to 7.4, or 6.4 to 7.4; and (d) a molecular weight distribution, (Mw/Mn) of from 2.2 to 3.6 or 2.5 to 3.5. In further embodiments, the second polyethylene composition may have a CDBI of less than 60%, 55%, or 52.5% to 60%. The second polyethylene composition is formed in the presence of a catalyst composition comprising a multi-metallic procatalyst via solution polymerization. The LLDPE may have a density in the range in the range of 0.912 to 0.940 grams/cm$^3$ and a melt index in the range of 0.5 to 30 grams/10 minutes. Exemplary LLDPE for use in the second outer layer of a multilayer film is commercially available under the trade names ELITE™, TUFLIN™, and DOWLEX™ from the Dow Chemical Company.

In some embodiments, the second outer layer comprises LLDPE in an amount from 0 to 100 percent, 50 to 100 percent, 75 to 100 percent, 85 to 100 percent, or 95 to 100 percent, by weight of the polymers present in the second outer layer. In other embodiments, the second outer layer comprises the second polyethylene composition in an amount from 0 to 100 percent, 50 to 100 percent, 75 to 100 percent, 85 to 100 percent, or 95 to 100 percent, by weight of the polymers present in the second outer layer. In further embodiments, the second outer layer may comprise LLDPE and the second polyethylene composition in a weight ratio ranging from 1:4 to 4:1 or 1:3 to 2:3. The second outer layer may further comprise one or more additives, such as pigments, inorganic fillers, UV stabilizers, antioxidants, etc.

The multilayer films described herein can be made by a variety of techniques, such as, cast film techniques, including mono- and biaxial orientation, as is generally known in the art. The multilayer films described herein may also be advantageously stretched at least 50%, preferably 100% in the machine and/or cross directions. In some embodiments, a multilayer cast film can be made by co-extruding a first outer layer composition, a core layer composition, and a second outer layer composition to form a multilayer cast film. The first outer layer composition comprises polyisobutylene and other resins as previously described herein; the core layer composition comprises a core layer polyethylene composition as previously described herein; and the second outer layer composition comprises a linear low density polyethylene or a second polyethylene composition as previously described herein, including additional components described herein. For example, the second outer layer composition may further comprise polyisobutylene, and in some embodiments, the second outer layer composition may comprise from 0.5 to 10 weight percent, based on the total weight of polymers present in the second outer layer, of polyisobutylene, as previously described herein. The core layer polyethylene composition, the first polyethylene composition, and the second polyethylene composition, used in the multilayer cast film may independently be the same or different from each other.

Embodiments of the multilayer cast films will now be further described in the following illustrative examples.

Test Methods

Density

Density can be measured in accordance with ASTM D-792, and is reported in grams/cubic centimeter (g/cc or g/cm$^3$).

Melt Index/Melt Flow Rate

Melt index (I2), for ethylene-based polymers, is measured in accordance with ASTM D 1238-10, Condition, 190° C./2.16 kg, and is reported in grams eluted per 10 minutes. Melt index (I10), for ethylene-based polymers, is measured in accordance with ASTM D 1238-10, Condition 190° C./10 kg, and is reported in grams eluted per 10 minutes.

Gel Permeation Chromatography (GPC)

A PolymerChar (Valencia, Spain) high temperature Gel Permeation Chromatography system consisting of an infrared concentration detector (IR-5) is used for Mw, Mn, Mz, and MWD (Mw/Mn) determination. The solvent delivery pump, the on-line solvent degas device, autosampler, and column oven are from Agilent. The column compartment and detector compartment are operated at 150° C. The columns are three PL gel 10 μm Mixed-B, columns (Agilent). The carrier solvent is 1,2,4-trichlorobenzene (TCB) with a flow rate of 1.0 mL/min. Both solvent sources for chromatographic and sample preparation contained 250 ppm of butylated hydroxytoluene (BHT) and are nitrogen sparged. Polyethylene samples are prepared at targeted polymer concentrations of 2 mg/mL by dissolving in TCB at 160° C. for 3 hour on the auto-sampler just prior the injection. The injection volume is 200 μL.

Calibration of the GPC column set is performed with 21 narrow molecular weight distribution polystyrene standards. The molecular weights of the standards ranged from 580 to 8,400,000 g/mol, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.42.

A third order polynomial is used to fit the respective polyethylene-equivalent calibration points obtained from equation (1) to their observed elution volumes. The actual polynomial fit is obtained so as to relate the logarithm of polyethylene equivalent molecular weights to the observed elution volumes (and associated powers) for each polystyrene standard.

Number-, weight- and z-average molecular weights are calculated according to the following equations:

$$\overline{Mn} = \frac{\sum_i Wf_i}{\sum_i (Wf_i / M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component. The MWD is expressed as the ratio of the weight average molecular weight (Mw) to the number average molecular weight (Mn).

The accurate A value is determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 120,000 g/mol.

Neutron Activation Method for Metals

Two sets of duplicate samples are prepared by transferring approximately 3.5 grams of the pellets into pre-cleaned 2 dram polyethylene vials. Standards are prepared for each metal tested from their NIST traceable standard solutions (Certi. pure from SPEX) into 2-dram polyethylene vials. They are diluted using milli-Q pure water to 6 ml and the vials are heat-sealed. The samples and standards are then analyzed for these elements, using a Mark I TRIGA nuclear reactor. The reactions and experimental conditions used for these elements are summarized in the table below. The samples are transferred to un-irradiated vials before doing the gamma-spectroscopy. The elemental concentrations are calculated using CANBERRA software and standard comparative technique. Table 1 provides measurement parameters for metals determination.

TABLE 1

Reactions and experimental conditions used for elements during neutron activation.

| Elements | Nuclear reaction | Isotope | Half life | Reactor Power |
| --- | --- | --- | --- | --- |
| Al | $^{27}$Al(n,γ)$^{28}$Al | $^{28}$Al | 2.24 m | 250 kW |
| Cl | $^{37}$Cl(n,γ)$^{38}$Cl | $^{38}$Cl | 37.2 m | 250 kW |
| Cr | $^{50}$Cr(n,γ)$^{51}$Cr | $^{51}$Cr | 27.7 d | 250 kW |
| Hf | $^{180}$Hf(n,γ)$^{181}$Hf | $^{181}$Hf | 42.4 d | 250 kW |
| Mg | $^{26}$Mg(n,γ)$^{27}$Mg | $^{27}$Mg | 9.46 m | 250 kW |
| Mo | $^{98}$Mo(n,γ)$^{99}$Mo | $^{99}$Mo | 66.0 h | 250 kW |
| Nb | $^{93}$Nb(n,γ)$^{94m}$Nb | $^{94m}$Nb | 6.26 m | 250 kW |
| Ta | $^{181}$Ta(n,γ)$^{182}$Ta | $^{182}$Ta | 114.4 d | 250 kW |
| Ti | $^{50}$Ti(n,γ)$^{51}$Ti | $^{51}$Ti | 5.76 m | 250 kW |
| W | $^{186}$W(n,γ)$^{187}$W | $^{187}$W | 23.7 h | 250 kW |
| V | $^{51}$V(n,γ)$^{52}$V | $^{52}$V | 3.75 m | 250 kW |
| Zr | $^{96}$Zr(n,γ)$^{97}$Zr | $^{97}$Zr | 16.91 h | 250 kW |

| Elements | Irradiation Time | Waiting Time | Counting Time | Gamma Energy, keV |
| --- | --- | --- | --- | --- |
| Al | 2 m | 4 m | 4.5 min | 1778.5 |
| Cl | 2 m | 4 m | 4.5 min | 1642.5, 2166.5 |
| Cr | 90 m | 5 h | 1.6 h | 320 |
| Hf | 90 m | 5 h | 1.6 h | 133, 482 |
| Mg | 2 m | 4 m | 4.5 min | 843.8, 1014 |
| Mo | 90 m | 5 h | 1.6 h | 181, 739.7, 141 |
| Nb | 2 m | 4 m | 4.5 min | 871 |
| Ta | 90 m | 5 h | 1.6 h | 1121, 1222 |
| Ti | 2 m | 4 m | 4.5 min | 320 |
| W | 90 m | 5 h | 1.6 h | 135, 481 |
| V | 2 m | 4 m | 4.5 min | 1434 |
| Zr | 90 m | 5 h | 1.6 h | 743.4 |

Dynamic Mechanical Spectroscopy (DMS)

Resins are compression-molded into "3 mm thick×1 inch" circular plaques at 350° F., for five minutes, under 1500 psi pressure, in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method had an additional five minute delay built in, to allow for temperature equilibrium. The experiments are performed at 190° C. over a frequency range of 0.1 to 100 rad/s. The strain amplitude is constant at 10%. The complex viscosity η*, tan (δ) or tan delta, viscosity at 0.1 rad/s (V0.1), the viscosity at 100 rad/s (V100), and the viscosity ratio (V0.1/V100) are calculated from these data.

Crystallization Elution Fractionation (CEF) Method

The Crystallization Elution Fractionation (CEF) technology is conducted according to Monrabal et al, Macromol. Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min. Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The IR-4 or IR-5 signal data is collected at one data point/second.

The CEF column is packed with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Comonomer Distribution Breadth Index (CDBI)

The CDBI is calculated using the methodology described in WO/93/03093 from data obtained from CEF. CDBI is defined as the weight percent of the polymer molecules having a comonomer content within 50 percent of the median total molar comonomer content. It represents a comparison of the comonomer distribution in the polymer to the comonomer distribution expected for a Bernoullian distribution.

CEF is used to measure the short chain branching distribution (SCBD) of the polyolefin. A CEF molar comonomer content calibration is performed using 24 reference materials (e.g., polyethylene octene random copolymer and ethylene butene copolymer) with a narrow SCBD having a comonomer mole fraction ranging from 0 to 0.108 and a Mw from 28,400 to 174,000 g/mole. The ln (mole fraction of ethylene), which is the ln (comonomer mole fraction), versus 1/T (K) is obtained, where T is the elution temperature in Kelvin of each reference material. The comonomer distribution of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317.

Ultimate Stretch

Ultimate stretch is tested on a Highlight Film Test System from Highlight Industries. The film roll is placed on the unwind section of the machine and the film is passed through a set of rollers. The film is then unwound with increasing force until it reaches its ultimate stretch point. Load cells measure the amount of force applied and a calculation is made to determine the amount of stretch present in the film, measured in percent. Three measurements are taken and averaged together to obtain the average ultimate stretch value. The film width is 20 inches.

On Pallet Tear Test

This test uses a Bruceton staircase method to determine the maximum force to load at which the film can be passed over a test probe for three wraps with no failures. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe for a maximum of three wraps. Any breakage of the film during any of the wrap is considered a failure at that force to load setting. Depending on the performance of the film at the load setting (i.e. passed or failed), the force to load is adjusted up or down, and the test is repeated at the new load setting. This continues until the maximum force at which no failures occurs is found. The Table below provides the equipment and settings used in this method.

| Equipment: | Lantech SHC Film Test Wrapper |
|---|---|
| Pre-stretch: | 250% |
| Turntable Speed: | 10 rpm |
| Force to Load (F2): | Variable |
| Probe Type: | 1" metal square pipe with a ½ " razor blade attached |
| Probe Protrusion Distance | 1 in |

Stretch Force, Unwind Force, Sound Level:

Stretch Force, Unwind Force, Sound Level are tested on a Highlight Film Test System from Highlight Industries. The film roll is placed on the unwind section of the machine and the film is passed through a set of rollers. The film is then unwound with increasing force until it reaches its ultimate stretch point. Load cells measure the amount of force applied to stretch (stretch force) and the force required to unwind (unwind force). The sound level is measured during this test with a built in Sound Level Meter in decibels unit. Three measurements are taken for each test and the stretch force, unwind force and sound level values are averaged. The film width is 20 inches for these tests.

On-Pallet Puncture:

This test uses a Bruceton staircase method to determine the maximum force to load at which the film can be passed over a test probe for three wraps with no failures. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe for a maximum of three wraps. Any breakage of the film during any of the wrap is considered a failure at that force to load setting. Depending on the performance of the film at the load setting (i.e. passed or failed), the force to load is adjusted up or down, and the test is repeated at the new load setting. This continues until the maximum force at which no failures occurs is found. The Table below provides the equipment and settings used in this method.

| | |
|---|---|
| Equipment: | Lantech SHC Film Test Wrapper |
| Pre-stretch: | 250% |
| Turntable Speed: | 10 rpm |
| Force to Load (F2): | Variable |
| Probe Type: | 4" by 4" blunt rod |
| Probe Protrusion Distance | 12 in |

Cling

On-pallet stretch cling (for stretch cling performance) can be measured by Lantech SHS test equipment. The test consists of stretching the film at 250% at a constant force F2 of 12 lbs. for 5 wraps with the turntable running at a rate of 10 rpm. The end of the film is then attached to a load cell which measures the amount of force, in grams, needed to pull the film off the drum.

EXAMPLES

The resins used in the multilayer cast films are shown in Tables 2 & 5. PE Resin 1 is produced via the method described below. Additional properties of PE Resin 1 and comparative polyethylene compositions are outlined in Table 5.

TABLE 2

Resin Properties

| Product | Description | Density (g/cm$^3$) | Melt index (MI or I2) (g/10 min) |
|---|---|---|---|
| LLDPE 1648, available from The Dow Chemical Company | LLDPE | 0.920 | 3.5 |
| DOWLEX ™ 2247G, available from The Dow Chemical Company | LLDPE | 0.917 | 2.3 |
| ATTANE ™ 4404G, available from The Dow Chemical Company | ULDPE | 0.904 | 4.0 |
| PIB Compound, PT-60, available from Polyfill Technologies Pvt. Ltd. (India) | 60% active polyisobutylene in a linear low density polyethylene carrier | 0.915 | — |
| PE Resin 1 | Polyethylene composition | See Table 5 | See Table 5 |

PE Resin 1

PE Resin 1 is prepared as follows: a multi-metal catalyst is prepared (Catalyst 1). Catalyst 1 is then used to prepare PE Resin 1 in a solution polymerization.

Catalyst 1 Preparation

To approximately 109 kg of 0.20 M MgCl$_2$ slurry was added 7.76 kg of EADC solution (15 wt % in heptanes), followed by agitation for 8 hours. A mixture of TiCl$_4$/VOCl$_3$ (85 mL and 146 mL, respectively) was then added, followed by a solution of Zr(TMHD)$_4$ (0.320 kg of a 0.30 M solution in Isopar E). These two additions were performed sequentially within 1 hour of each other. The resulting catalyst premix was aged with agitation for an additional 8 h prior to use.

Production of PE Resin 1

PE Resin 1 is made according to the following procedures: All raw materials (ethylene, 1-hexene) and the process solvent (an isoparaffinic solvent under the tradename ISOPAR E, which is commercially available from Exxon-Mobil Corporation) are purified with molecular sieves before introduction into the reaction environment. Hydrogen is supplied in pressurized cylinders as a high purity grade and is not further purified. The reactor monomer feed (ethylene) stream is pressurized via a mechanical compressor to a pressure that is above the reaction pressure, e.g. 750 psig. The solvent and comonomer (1-hexene) feed is pressurized via a mechanical positive displacement pump to pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor consists of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at two locations roughly with equal reactor volumes between each injection location. The fresh feed is controlled typically with each injector receiving half of the total fresh feed mass flow. The catalyst components are injected into the polymerization reactor through a specially designed injection inlet device and are combined into one mixed procatalyst/cocatalyst feed stream prior to injection into the reactor. The cocatalyst component is fed based on calculated specified molar ratios to the procatalyst component. Immediately following each fresh injection location (either feed or catalyst), the feed streams are mixed with the circulating polymerization reactor contents with Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as anti-oxidants can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve (responsible for maintaining the pressure of the reactor at a specified target). The stream then enters a two stage separation and devolatilization system where the polymer is removed from the solvent, hydrogen, and unreacted monomer and comonomer. Impurities are removed from the recycled stream before entering the reactor again. The separated and devolatilized polymer melt is pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. The recycled solvent can still have unreacted co-monomer in it that is fortified with fresh co-monomer prior to re-entry to the reactor. The recycled solvent can still have some hydrogen which is then fortified with fresh hydrogen. Table 4 summarizes the polymerization conditions for PE Resin 1

TABLE 3

| Reactor Data | |
| --- | --- |
| REACTOR FEEDS | PE Resin 1 |
| Primary Reactor Feed Temperature (° C.) | 40 |
| Primary Reactor Total Solvent Flow (lb/hr) | 1,948 |
| Primary Reactor Fresh Ethylene Flow (lb/hr) | 375 |
| Primary Reactor Total Ethylene Flow (lb/hr) | 390 |
| Comonomer Type | 1-hexene |
| Primary Reactor Fresh Comonomer Flow (lb/hr) | 41 |
| Primary Reactor Total Comonomer Flow (lb/hr) | 210 |
| Primary Reactor Feed Solvent/Ethylene Ratio | 5.19 |
| Primary Reactor Fresh Hydrogen Flow (sccm) | 5096 |
| Primary Reactor Hydrogen mole % | 0.200 |
| REACTION CONDITIONS | |
| Primary Reactor Control Temperature (° C.) | 175 |
| Primary Reactor Pressure (Psig) | 725 |
| Primary Reactor FTnIR Outlet [C2] (g/L) | 8.1 |
| Primary Reactor log10 Viscosity (log(cP)) | 2.29 |
| Primary Reactor Polymer Concentration (wt %) | 17.2 |
| Primary Reactor Exchanger's Heat Transfer Coefficient (BTU/(hr ft$^2$ ° F.)) | 33 |
| Primary Reactor Polymer Residence Time (hr) | 0.08 |
| Overall Ethylene conversion by vent (wt %) | 92.0 |
| CATALYST | |
| Primary Reactor Catalyst | Catalyst 1 |
| Primary Reactor Catalyst Flow (lb/hr) | 1.02 |
| Primary Reactor Catalyst Concentration (ppm) | 258 |
| Primary Reactor Catalyst Efficiency (M lbs Poly/lb Zr) | 1.52 |
| Primary Reactor Catalyst Metal Molecular Weight (g/mol) | 47.9 |
| Primary Reactor Co-Catalyst-1 Molar Ratio | 10.0 |

TABLE 3-continued

| Reactor Data | |
| --- | --- |
| REACTOR FEEDS | PE Resin 1 |
| Primary Reactor Co-Catalyst-1 Type | tri-ethyl-aluminum |
| Primary Reactor Co-Catalyst-1 Flow (lb/hr) | 1.57 |
| Primary Reactor Co-Catalyst-1 Concentration (ppm) | 4,000 |

TABLE 4

| | PE Composition Resin Properties | | |
| --- | --- | --- | --- |
| Type | PE Resin 1 | DOWLEX ™ 2247G | LLDPE 1648 |
| Density (g/cc) | 0.917 | 0.917 | 0.920 |
| $I_2$, g/10 min | 3.0 | 2.3 | 3.5 |
| $I_{10}/I_2$ | 6.9 | 7.6 | 8.0 |
| Mn (g/mol) | 33,128 | 25,629 | 21,493 |
| Mw (g/mol) | 86,781 | 96,844 | 84,749 |
| Mz (g/mol) | 242,516 | 292,716 | 245,449 |
| Mw/Mn | 3.3 | 3.78 | 3.94 |
| CDBI (%) | 53.0 | 46.0 | 52.0 |
| Viscosity (Pa-s at 190° C.) 0.1 rad/s | 2,788 | 3,484 | 2,513 |
| Viscosity (Pa-s at 190° C.) 100 rad/s | 1,041 | 1,075 | 836 |
| (Viscosity 0.1 rad/s)/(Viscosity 100 rad/s) | 2.68 | 3.24 | 3.01 |
| Tan Delta 0.1 rad/s | 29 | 24 | 20 |

TABLE 5

| Neutron Activation Data* | | | | | | | |
| --- | --- | --- | --- | --- | --- | --- | --- |
| Type | Al, ppm | Mg, ppm | Ti, ppm | V, ppm | Hf, ppb | Zr, ppb | Cl, ppm |
| PE Resin 1 | 56 | 116 | 0.76 | 1.8 | ND @ 10 | 900 | 65 |

*Niobium (Nb) (5 ppm), tantalum (Ta) (50 ppb), chromium (Cr) (0.5 ppm), molybdenum (Mo) (50 ppb), and tungsten (W) (5 ppm) were not detected in any of the examples at their respective detection limits, as indicated in the parentheses following each element.

Example 1

Three layer cast films were made using a Dolci 3-layer cast line having 3 extruders. The first outer layer has a layer ratio of 16%, the core layer has a layer ratio of 64%, and the second outer layer has a layer ratio of 20%. The temperature profile of the extruders is as follows: Extruder A: 160/217/220/255/270/270/270; Extruder B: 150/220/240/260/270/270/270; and Extruder C: 150/220/235/255/270/270/270. The adapter temperature is 270° C., and the die temperature is 270° C. The chill roll temperature is 20° C. The die gap is 2.5 cm. The line speed is 750 m/min. The film thickness is 20 microns. The film structures and film properties are further outlined in Table 6 below.

TABLE 6

Cast Film Structures & Properties

| Film Description | Inventive film 1 | Inventive film 2 | Comparative film 1 |
|---|---|---|---|
| First Outer Layer (16%) | 87.5% PE Resin 1 12.5% PIB masterbatch | 87.5% PE Resin 1 12.5% PIB masterbatch | 87.5% DOWLEX ™ 2247G 12.5% PIB masterbatch |
| Core Layer (64%) | 67% PE Resin 1 33% LLDPE 1648 | 100% PE Resin 1 | 67% DOWLEX ™ 2247G 33% LLDPE 1648 |
| Second Outer Layer (20%) | 67% PE Resin 1 33% LLDPE 1648 | 100% PE Resin 1 | 67% DOWLEX ™ 2247G 33% LLDPE 1648 |
| Thickness, microns | 20 | 20 | 20 |
| Avg ultimate stretch, % | 396.6 | 358 | 336.3 |
| Stretch force @ 200%, lbs | 65.2 | 61.2 | 67.5 |
| Unwind force @ 200%, lbs | 9.6 | 10.0 | 9.0 |
| Sound level, dB | 81.6 | 81.2 | 78.5 |
| On-pallet tear @ 250% pre-stretch, lbs | 13.3 | 13.2 | 11.7 |
| On-pallet puncture @ 250% pre-stretch (F2 force), lbs | 12.3 | 11.7 | 12.6 |
| Cling @ 250% pre-stretch, grams | 32.7 | 32.8 | 10.2 |

As shown in Table 6, higher cling values are achieved from the inventive films over the comparative films.

Example 2

Three layer cast films were made using a Dolci 5-layer cast line having 5 extruders. The first outer layer has a layer ratio of 15%, the core layer has a layer ratio of 70%, and the second outer layer has a layer ratio of 15%. The temperature profile of the extruders is as follows: Extruder A: 160/180/190/210/230/250/260; Extruder B: 160/180/190/210/230/250/260; Extruder C: 160/180/190/210/230/250/260; Extruder D: 160/180/190/210/230/250/260; and Extruder E: 160/180/190/210/230/250/260. The adapter temperature is 260° C. The die temperature is 260° C. The chill roll temperatures is 20° C. The die gap is 3 cm. The line speed is 200 m/min. The film thickness is 20 microns. The film structures and film properties are further outlined in Table 7 below.

TABLE 7

Cast Film Structures & Properties

| Film Description | Inventive film 3 | Comparative film 2 |
|---|---|---|
| Skin Layer (15%) | 95% PE Resin 1 5% PIB masterbatch | 94% DOWLEX ™ 2247G 6% PIB masterbatch |
| Core Layer (5%) | 100% PE Resin 1 | 100% DOWLEX ™ 2247G |
| Core Layer (50%) | 100% PE Resin 1 | 100% DOWLEX ™ 2247G |
| Core Layer (15%) | 100% PE Resin 1 | 100% DOWLEX ™ 2247G |
| Skin Layer (15%) | 95% PE Resin 1 5% PIB masterbatch | 94% DOWLEX ™ 2247G + 6% PIB masterbatch |
| Thickness, microns | 20 | 20 |
| Avg ultimate stretch, % | 309.2 | 282.5 |
| Stretch force @, 200% lbs | 60.3 | 63.1 |
| Unwind force @ 200%, lbs | 11.0 | 8.9 |
| Sound level, dB | 96.0 | 94.7 |
| On-pallet tear @ 250% pre-stretch, lbs | 9.2 | 7 |
| On-pallet puncture @ 250% pre-stretch (F2 force), lbs | 13 | 12 |
| Cling @ 250% pre-stretch, grams | 16.0 | 12.0 |

As shown in Table 7, a higher cling value is achieved for inventive film 3, even though it has a lower amount of the PIB masterbatch, than comparative film 2.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer cast film comprising a first outer layer, a core layer, and a second outer layer, wherein:
    the first outer layer comprises (a) a linear low density polyethylene (LLDPE), ultra-low density polyethylene (ULDPE), a first polyethylene composition, or combinations of two or more thereof, and (b) polyisobutylene; and
    the core layer comprises a core layer polyethylene composition which comprises the reaction product of ethylene and, optionally, one or more alpha olefin comonomers, wherein the core layer polyethylene composition is characterized by the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.5 to 3.6;
    wherein the core layer polyethylene composition has a metal catalyst residual of greater than or equal to 1 parts by combined weight of at least three metal residues per one million parts of core layer polyethylene composition.

2. The film of claim 1, wherein the first outer layer comprises from 0.5 to 10 weight percent, based on the total weight of polymers present in the first outer layer, of polyisobutylene.

3. The film of claim 1, wherein the first outer layer further comprises a first polyethylene composition which comprises the reaction product of ethylene and, optionally, one or more alpha olefin comonomers, wherein the first polyethylene composition is characterized by the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.2 to 3.6.

4. The film of claim 1, wherein the second outer layer comprises a linear low density polyethylene or a second polyethylene composition which comprises the reaction product of ethylene and, optionally, one or more alpha olefin comonomers, wherein the second polyethylene composition is characterized by the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.2 to 3.6.

5. The film of claim 4, wherein the second outer layer further comprises polyisobutylene.

6. The film of claim 5, wherein the second outer layer comprises from 0.5 to 10 weight percent, based on the total weight of polymers present in the second outer layer, of polyisobutylene.

7. The film of claim 1, wherein the core layer polyethylene composition is formed in the presence of a catalyst composition comprising a multi-metallic procatalyst via solution polymerization.

8. The film of claim 1, wherein the core layer polyethylene composition has a Comonomer Distribution Breadth Index (CDBI) of less than 60%, or from 52.5% to 60%.

9. The film of claim 1, wherein the core layer polyethylene composition has a viscosity ratio (viscosity at 0.1 rad/s/viscosity at 100 rad/s, both measured at 190° C. using dynamic mechanical spectroscopy) of 2 to 6, or from 2.0 to 2.9.

10. The film of claim 1, wherein the core layer polyethylene composition has a melt flow ratio, I10/I2, of from 6.0 to 7.4, or from 6.4 to 7.4.

11. A method of making a multilayer cast film, the method comprising:
    coextruding a first outer layer composition, a core layer composition, and a second outer layer composition to form a multilayer cast film;
    wherein the first outer layer composition comprises (a) a linear low density polyethylene (LLDPE), ultra-low density polyethylene (ULDPE), a first polyethylene composition, or combinations of two or more thereof, and (b) polyisobutylene;
    wherein the core layer composition comprises a core layer polyethylene composition which comprises the reaction product of ethylene and, optionally, one or more alpha olefin comonomers, wherein the polyethylene composition is characterized by the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.2 to 3.6; and
    wherein the second outer layer composition comprises a linear low density polyethylene or a second polyethylene composition which comprises the reaction product of ethylene and, optionally, one or more alpha olefin comonomers, wherein the polyethylene composition is characterized by the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.2 to 3.6.

12. The method of claim 11, wherein the second outer layer composition further comprises polyisobutylene.

13. The method of claim 12, wherein the second outer layer composition comprises from 0.5 to 10 weight percent, based on the total weight of polymers present in the second outer layer, of polyisobutylene.

* * * * *